July 4, 1950   E. L. MASTERS   2,513,810
FERTILIZER SPREADER
Filed April 10, 1946   2 Sheets-Sheet 2
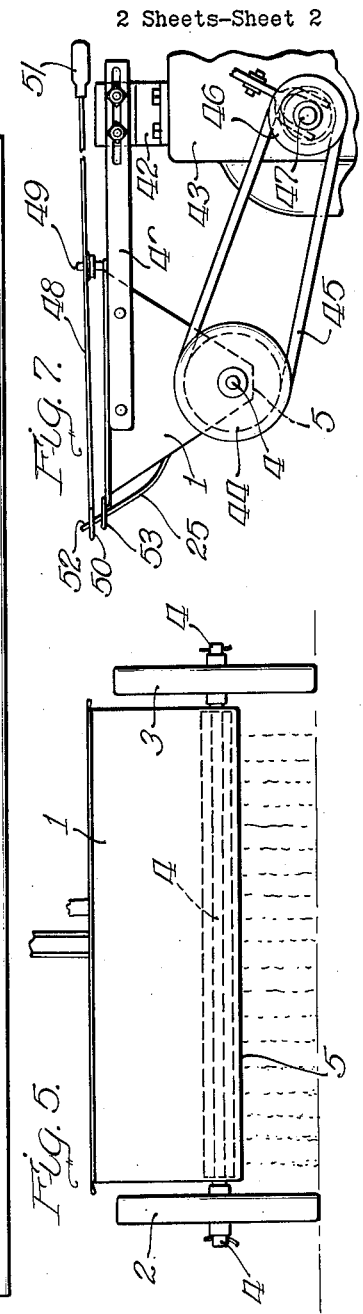
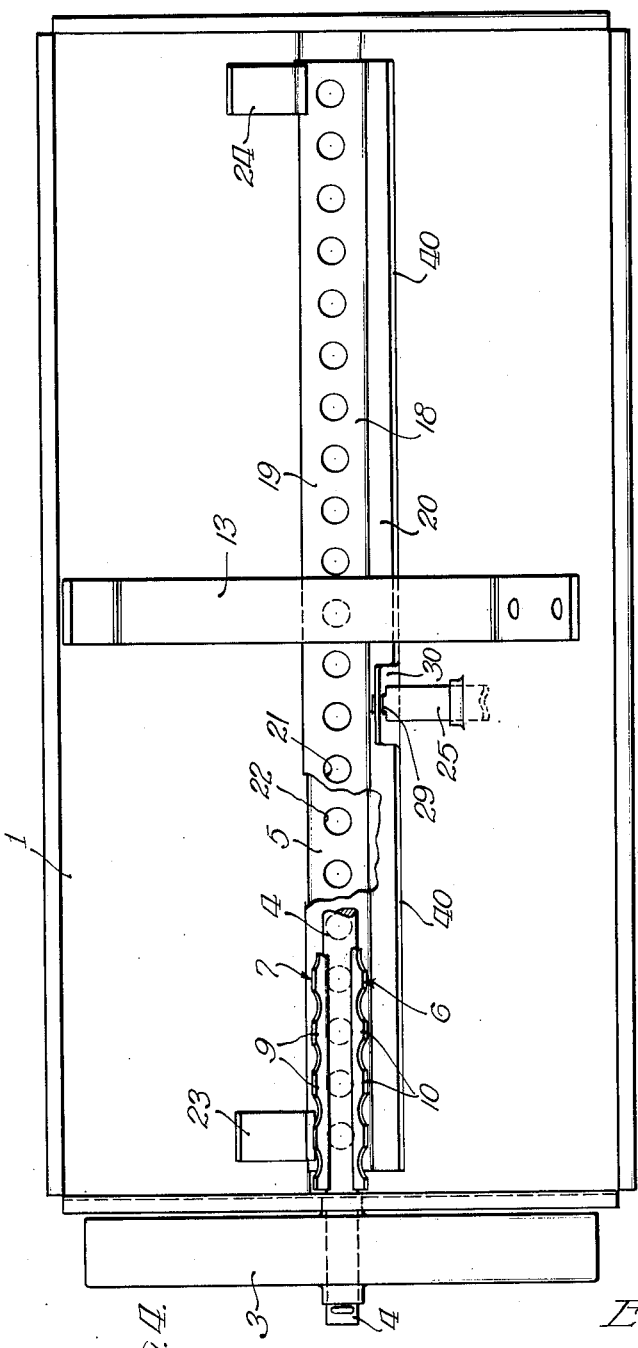
INVENTOR.
Edwin L. Masters
BY
Charles K Wood
Agent.

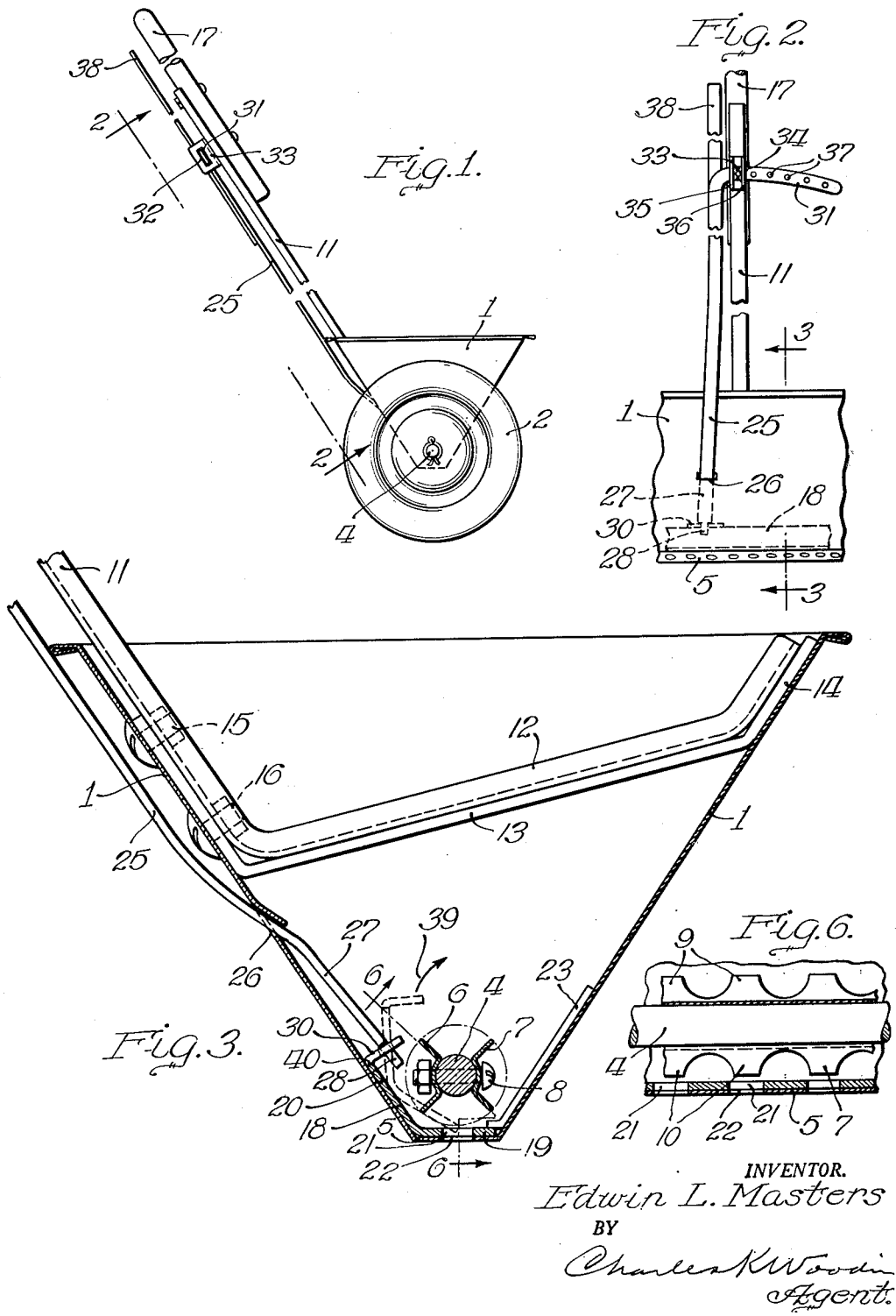

Patented July 4, 1950

2,513,810

UNITED STATES PATENT OFFICE 2,513,810

FERTILIZER SPREADER

Edwin L. Masters, Benton Harbor, Mich.

Application April 10, 1946, Serial No. 660,941

4 Claims. (Cl. 222—485)

This invention is directed to a fertilizer spreader incorporating certain novel features that may be embodied in any type of spreader used for the distribution of fertilizers and plant foods.

One of the main objects of the present invention is to provide a spreader including relatively movable metering mechanism for the regulation of the discharge of fertilizer from within the bin containing the same, and which mechanism is readily removable for cleaning purposes or for replacement, if necessary.

Another object of the present invention is to provide a slidably supported angle bar having registering perforations coacting with the bin perforations and wherein this bar is shaped and installed within the bin bottom so as to dispose the metering portion of the angle bar directly beneath an agitator and to dispose another portion of the angle bar in sliding contact with one of the bin walls and extending upwardly from beneath the agitator, such upwardly extending angle portion providing accessible means to readily pry the metering angle bar loose from the bottom in the event that this bar is corroded to the bin bottom. Obviously, under normal conditions of use, the angle bar may be readily removed by taking hold of the upwardly extending angle portion to rotate the entire bar about the axis of the agitator for removal from the bin for cleaning purposes.

A further object of the present invention is to provide actuating mechanism for the metering means for regulating the displacement of the metering means with respect to the discharge openings in the bottom of the bin; and to provide cooperative means which form the connection between the actuating means and the metering means and which coact to freely separate the actuating means from the metering means to permit such metering means to be freely removed from the bottom of the bin for the purposes of cleaning the same and the bin bottom.

An additional feature incorporated in the fertilizer spreader is the manner in which the actuating mechanism is mounted by providing a slot in the side of the fertilizer bin through which the actuating bar extends, such slot providing fulcrum means for the bar to accomplish the shifting of the metering means within the bin bottom. The actuating bar extends upwardly outside of the bin and in a position adjacent the handle which guides the wheel supported bin, and detent mechanism is incorporated to cooperate between the actuating means and said handle to hold the actuating bar at a predetermined angularity with respect to the fertilizer bin thereby positioning such metering means at a predetermined relation with respect to the apertures in the bin bottom.

It is contemplated to use stainless steel in fabricating the metering means as well as the bin itself or at least the bottom portion thereof that is apertured and acted upon by the metering bar. In addition, the spreader construction is simplified by having an agitator that may be readily disassembled for cleaning purposes whenever that should become necessary.

All other objects and advantages inherent in the present design of spreader construction shall hereinafter appear in the following detailed description having reference to the accompanying drawings forming a part of this specification.

In the drawings:

Fig. 1 is a side elevational view of a preferred construction of spreader incorporating the principles of the present invention;

Fig. 2 is a fragmentary rear view of the spreader substantially as seen along the line 2—2 in Fig. 1 to illustrate certain details of construction thereof;

Fig. 3 is a transverse vertical sectional view through the spreader bin and the operative mechanisms connected therewith substantially as viewed along the line 3—3 in Fig. 2;

Fig. 4 is a plan view of bin of the spreader with certain portions broken away and other elements omitted to better show some of the details of construction;

Fig. 5 is a front elevational view of the spreader to illustrate the general proportions of the bin and wheels therefor;

Fig. 6 is a fragmentary sectional detail of the agitator and its relation to the bottom structure approximately as indicated by the line 6—6 in Fig. 3; and Fig. 7 is a general view showing an arrangement to illustrate the use of a fertilizer spreader incorporating the features of the present invention but wherein the spreader is mounted upon a tractor and wherein the agitator is driven from suitable power take-off means driven from the tractor.

Figs. 1 and 5 illustrate the fertilizer spreader bin 1 supported upon the wheels 2 and 3 by means of a shaft 4 which traverses the bin 1 adjacent the bottom 5 thereof. This shaft 4 supports two vaned strips 6 and 7 secured by means of two or more screws such as 8 to the shaft 4 for rotation directly therewith whenever the wheels 2 and 3 are moved over the ground. The structure described comprises an agitator rotatably operating within the bin 1 immediately adjacent the bottom thereof. The vane strips 6 and 7 are provided with spaced teeth 9 and 10 respectively extending along the lengths thereof as best shown in Figs. 4 and 6.

The vane strips 6 and 7 may be made of stainless steel to resist corrosion and it is to be noted that by removing the screws 8, such strips may be easily removed from the shaft 4 for cleaning purposes or for replacement if required.

The wheeled bin 1 is guided by means of a handle 11 shaped as shown in Figs. 1, 2 and 3 with the end 12 in Fig. 3 resting upon the brace 13 extending across the bin 1 as shown in Figs. 3 and 4. Brace 13 is preferably spot welded to the bin at 14, and a pair of bolts 15 and 16 secure the brace and the handle 11 to the bin as illustrated in Fig. 3. Handle 11 is supplemented by the use of a wooden hand grip 17 for conveniently manipulating the movements of the fertilizer cart.

A metering means is disposed in the bottom of the bin 1 and as best shown in Figs. 3 and 4 comprises an angle bar 18 having a flat leg 19 disposed for sliding movement within the bottom 5 of the bin, and angularly disposed with respect thereto a second leg 20 extending upwardly at an angle to slide adjacent to one of the angularly disposed walls of the bin 1. The leg 19 thereof is provided with a plurality of apertures 21 that are adapted to register with the openings 22 formed in the bottom 5 of the bin, whereby relative shifting of the angle bar 18 with respect to the bottom closes or opens the openings 22 accordingly to provide a predetermined control over the amount of fertilizer being discharged from within the bin.

This metering angle bar 18 is guided within the bottom by a pair of brackets 23 and 24 that are secured to the bin 1 and with each having a portion thereof overlying one edge of the angle bar as seen in Figs. 3 and 4.

The other leg 20 or opposite side of the angle bar 18 is retained by means of the actuating mechanism employed for shifting the bar 18 longitudinally within the bottom of the spreader bin. This actuating means comprises a vertically extending bar or strap 25 which is positioned to extend through a slot 26 formed in one side of the bin 1. This strap has one end 27 located within the bin which terminates in a reduced end 28 that is adapted to project through an opening 29 formed in an ear or other projection 30 forming an integral portion of the upwardly extending leg 20 of the angle bar 18. The outer free end of the strap 25 terminates in an arcuate arm 31 seen in Fig. 2 which is adapted for movement through openings 32 provided in a bracket 33 secured to the handle 11. Bracket 33 is U-shaped in construction providing two projecting legs 35 and 36 as shown in Fig. 2, and a suitable cotter pin or any form of a removable pin 34 is passed through any one of the apertures 37 formed in the arm 31 to fix the angular position of the bar or strap 25 with respect to the handle 11 which also determines the angular position of the bin end 27 of the strap and the position of the bar 18 through the instrumentality of the slot 26 which fulcrums the strap 25 as best illustrated in Fig. 2.

It should be noted from Figs. 1 and 2 that the strap 25 is provided with an extended arm 38 flanking the handle 17 as a convenient means for manipulating the angularity of the strap 25 and the restricted position of the bar 18 within the bottom of the bin 1.

One of the biggest difficulties in the past with spreaders of this type has been the difficulty of maintaining the same in operation, and particularly in keeping the metering mechanisms thereof functioning as the latter are always subjected to corrosion and sticking as well as being attacked from the chemicals in the fertilizers used. Normal care in the maintenance of such spreaders will alleviate the situation considerably but the factors which ented into the picture which slowly corrode or otherwise affect the moving parts cannot be overcome even with utmost care. Any fertilizer retained within the bottom or upon the respective moving parts will be affected by dampness causing such parts to bind or firmly hold together which in same cases will be so extreme as to render the spreader useless in view of the damage that would be caused in attempting to free up the moving parts. Furthermore, a careless user may allow the spreader to stand in a position where the fertilizer therein becomes soaked from rain or he may store the fertilizer in a shed having a leaking roof which will lead to the same results.

It has been one of the main ideas of the present fertilizer spreader to incorporate mechanism which can be easily cleaned and replaced to keep the main working parts thereof in good order and to considerably extend the life and use of such a fertilizer spreader under efficient operating conditions.

This has been done by the introduction of a stainless steel metering bar 18 shaped as described and shown in Figs. 3 and 4 and by installing this bar for longitudinal shifting movement within the bottom of the bin 1. This has been done as described by means of the brackets 23 and 24 to maintain one edge of the bar in operative position within and against the bottom 5 while the end 27 of the actuating strap 25 is provided with the lug 28 to cooperate directly with the ear 30 through the opening 29 therein to produce cooperative separable means whereby the strap 25 can be released from its detent mechanism through angular shifting thereof, after removing the cotter pin 34, and vertically withdrawn through the opening 26 in the bin and away from the ear 30 of the shiftable angle bar 18. This action frees the opposite side or leg 20 of the angle bar and permits the same to be rotated as indicated in the broken line position in Fig. 3 and in the direction of the arrow 39 to remove the slide bar from underneath the agitator unit. The latter can be easily rotated to so position the vanes 6 and 7 as to allow free removal of such bar 18 as is obvious from an inspection of Fig. 3. In the event that the spreader has not been used for a considerable period of time or through other intervening conditions, the bar 18 may be somewhat corroded to the bottom of the bin. In this event, it is possible to insert a screw driver or any flat pointed implement or tool between the upper edge 40 of the bar and the side of the bin at any point therealong to conveniently pry the leg 20 of the bar 18 away from this adjacent side of the bin whereby the leg 19 of the bar will be directly lifted or fulcrumed off of the bottom 5 loosening the entire bar from such bottom for removal in the manner described above.

This spreader has been disclosed as a device designed primarily for garden purposes which merely necessitates the use of a relatively small capacity fertilizer bin having light weight wheel construction for moving the same and incorporating a reasonably light weight handle and other associated mechanisms such as described. The principles herein involved, however, may also be applied to any kind of fertilizer spreader inasmuch as they are subjected to the same corrosive action by the fertilizer particularly when dampness or water intervenes to accelerate the chemical action.

Fig. 7 portrays the use of a fertilizer distributor constructed in the same manner as the preferred distributor described but wherein the same is adapted particularly for use in connection with a tractor to accomplish the spreading operation. Fig. 7 shows the bin 1 which includes the same working parts and mechanisms as in the described form supported by a bracket 41 mounted upon a suitable standard 42 secured to the rear end of a tractor 43. The shaft 4 in this particular arrangement is driven by means of pulley 44 connected by belt 45 with a clutch controlled pulley 46 driven from a power take-off shaft 47 operated by the tractor.

The metering adjustment may be obtained in any suitable manner in a spreader mounted according to the illustration in Fig. 7. It may be preferable to provide means extending in the vicinity of the operator of the tractor to allow shifting of the metering means while operating the tractor. Such a means is diagrammatically illustrated as including a relatively long lever 48 pivotally connected at 49 having a fork 50 at one end and a handle 51 at the other end to be manipulated by the operator. Fork 50 straddles the upper end 52 of the strap 25 the latter is guided by means of a bracket 53 secured to the bin 1 of the spreader. Sidewise manipulation of the handle 51 will therefore shift the angular position of the strap 25 and the latter will actuate the bar 18 to vary the discharge openings in the bottom 5 of the distributor. Any such or analogous construction may be used for accomplishing this last named purpose.

Other modifications and changes are contemplated in the disclosure illustrating a preferred arrangement and combination of parts to accomplish the purposes of the objects presented. Such modifications together with any equivalent mechanisms that may be substituted to accomplish the same results shall be governed by the breadth and scope of the appended claims submitted herewith to define the invention.

What I claim is:

1. In a fertilizer spreader, a bin with converging walls terminating in a bottom, said bottom having a series of feed holes, an angular metering plate in the bottom of said bin having a flange with a series of apertures slidable over the bottom of the bin and a guide flange slidable along one side wall of the bin, said last mentioned side wall having an opening, an actuating lever extending through and fulcrumed in said opening, means on said guide flange for removably connecting the lower end of said lever thereto and means for latching said lever in any adjusted position.

2. In a fertilizer spreader, a bin having converging side walls terminating in a narrow bottom, said bottom having a series of feed holes, a slidable feed regulating plate in said bin and resting upon the bottom thereof and having angularly extending guide means engaging a side wall of the bin, said last mentioned side wall having an opening, a lever extending through and fulcrumed in said opening and having a detachable connection with said guide means for the purpose set forth.

3. In a fertilizer spreader, a wheeled bin having side walls, a handle connected to said bin for guiding the movements thereof, said bin having a series of feed holes in the bottom thereof, a feed regulating plate in said bin and resting over said series of holes, said plate having a series of feed holes and a lateral guide flange engaging a wall of said bin, said last mentioned wall having an opening, a plate adjusting lever extending through and fulcrumed in said opening, means on said guide flange for detachably connecting the lower end of the lever thereto, and cooperating means on said lever and handle for latching said lever in adjusted position.

4. In a fertilizer spreader, a wheeled bin having converging side walls terminating in a narrow bottom having a series of feed holes, a guide handle connected to said bin for guiding the movements thereof, a feed regulating plate having a series of holes within said bin and slidable upon the bottom thereof, said guide plate having a lateral and angular guide portion engaging a wall of said bin, said last mentioned wall having an opening, a lever extending through and fulcrumed in said opening, means on the guide portion of said plate for detachably connecting the lower end of said lever thereto, the upper end of said lever having a laterally extending arm and means for latching said arm to said handle.

EDWIN L. MASTERS.

REFERENCES CITED

The following references are of record in the file of this patent:

UNITED STATES PATENTS

| Number | Name | Date |
| --- | --- | --- |
| 1,161,370 | Ayers | Nov. 23, 1915 |
| 1,965,483 | Woods | July 3, 1934 |
| 1,976,725 | Helm | Oct. 16, 1934 |
| 1,985,191 | Nottingham | Dec. 18, 1934 |
| 2,318,064 | Delaney | May 4, 1943 |

FOREIGN PATENTS

| Number | Country | Date |
| --- | --- | --- |
| 199,694 | Switzerland | Nov. 16, 1938 |